United States Patent
Valsaraj et al.

(10) Patent No.: US 6,602,024 B1
(45) Date of Patent: Aug. 5, 2003

(54) ENVIRONMENTAL REMEDIATION OF DENSE ORGANIC CONTAMINANTS USING POLYAPHRON TREATMENTS

(75) Inventors: Kalliat T. Valsaraj, Baton Rouge, LA (US); Karsten E. Thompson, Baton Rouge, LA (US); Danny D. Reible, Baton Rouge, LA (US); Le Yan, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 10/189,207

(22) Filed: Jul. 3, 2002

(51) Int. Cl.$^7$ .................................................. B09C 1/10
(52) U.S. Cl. ........................... 405/128.5; 405/128.7; 405/128.75; 210/749; 210/747; 210/705
(58) Field of Search .................. 405/128.5, 128.15, 405/128.7, 128.75; 210/749, 705, 747

(56) References Cited

U.S. PATENT DOCUMENTS

| | | | | |
|---|---|---|---|---|
| 4,486,333 A | * | 12/1984 | Sebba | 516/14 |
| 4,999,198 A | * | 3/1991 | Barnett et al. | 424/449 |
| 5,171,475 A | * | 12/1992 | Freiesleben | 510/417 |
| 6,022,727 A | * | 2/2000 | Worden et al. | 435/243 |
| 6,099,206 A | * | 8/2000 | Pennell | 405/128.5 |
| 6,190,092 B1 | * | 2/2001 | Miller | 405/263 |
| 6,210,955 B1 | | 4/2001 | Hayes | 435/262.5 |
| 6,261,029 B1 | * | 7/2001 | Miller | 405/263 |
| 6,492,572 B2 | * | 12/2002 | Batchelor et al. | 588/205 |

OTHER PUBLICATIONS

Fountain, J.C. et al., "Controlled Field Test of Surfactant-enhanced Aquifer Remediation," *Ground Water*, vol. 34(5), pp. 910–916 (1996).

Hirasaki, G.J. et al., "Surfactant/foam Process for Aquifer Remediation," pp. 471–480, proceedings of the SPE International Symposium on Oilfield Chemistry (Houston, Texas, Feb. 18–21, 1997).

Kostarelos, K. et al., "A new concept: the use of neutrally-buoyant microemulsions for DNAPL remediation," *J. Contaminant Hydrology*, vol. 34, pp. 383–397 (1998).

Lunn, S. et al., "Manipulation of density and viscosity for the optimization of DNAPL recovery by alcohol flooding," *J. Contam. Hydrol.*, vol. 38, pp. 427–455 (1999a).

Lunn, S. et al., "Risk Reduction During Chemical Flooding: Preconditioning DNAPL Density in Situ Prior to Recovery by Miscible Displacement," *Environ. Sci. Technol.*, vol. 33, pp. 1703–1708 (1999b).

Miller, C.T. et al., "Remediation of DNAPL–Contaminated Subsurface Systems Using Density–Motivated Mobilization," *Environ. Sci. Technol.*, vol. 34, No. 4, pp. 719–724 (2000).

(List continued on next page.)

*Primary Examiner*—J. J. Swann
*Assistant Examiner*—Katherine Mitchell
(74) *Attorney, Agent, or Firm*—André J. Porter; John H. Runnels; Bonnie J. Davis

(57) ABSTRACT

A novel method that promotes upward mobilization of dense nonaqueous-phase liquid contaminants. In one embodiment, the method comprises the steps of: (1) injecting a treating agent (e.g., a polyaphron solution) comprising a light organic-phase fluid (e.g., kerosene, xylene, octane, hexane, etc.) into the Earth's subsurface, targeted within or adjacent to the dense contaminant source zone; and (2) injecting a post-flush agent comprising a polyvalent cation (e.g., $Al^{3+}$, $Fe^{3+}$, etc.), or similar species, once the treating agent is displaced throughout the source zone. The treating agent converts the contaminant to a density less than the density of groundwater by inducing in-situ mixing. The post-flush agent destabilizes the polyaphrons thus allowing the contaminant and the treating agent to mix.

9 Claims, 2 Drawing Sheets

OTHER PUBLICATIONS

National Research Council, *Groundwater and Soil Cleanup*, pp. 4–11 (National Academy Press, Washington D.C. (1999).

Pennell, K.D. et al., "Influence of Viscous and Buoyant Forces on the Mobilization of Residual Tetrachloroethylene During Surfactant Flushing," *Environ. Sci. Technol.*, vol. 30, No. 4, pp. 1328–1335 (1996).

Roeder, E. et al., "Swelling of DNAPL by Cosolvent Flooding to Allow its Removal as an LNAPL," 333–345, proceedings of the ASCE Specialty Conference, Washington D.C. (Nov. 12–14, 1996).

Sebba, F. et al., *Foams and Biliquid Foams–Aphrons*, pp. 103–127 (John Wiley & Sons, New York, 1987).

Thompson, K. et al., "Novel Method for DNAPL Recovery Using Polyaphron Treatments," on Dec. 20, 2001.

Vidrine, W. et al., "Emulsions in porous media. I. Transport and stability of polyaphrons in sand packs," *Colloids and Surfaces*, vol. 175, pp. 277–287 (2000).

Zhang, C. et al., "Studies in solvent extraction using polyaphrons. I. Size Distribution, Stability, and Flotation of Polyaphrons," Separation Science and Tech., vol. 31, No. 8, pp. 1059–1074 (1996).

Zhang, C. et al., "Studies in Solvent Extraction Using Polyaphrons. II. Semibatch and Continuous Countercurrent Extraction/Flotation of a Hydrophobic Organic Dye from Water," Separation Science and Tech., vol. 31, No. 10, pp. 1463–1482 (1996).

* cited by examiner

ENVIRONMENTAL REMEDIATION OF DENSE ORGANIC CONTAMINANTS USING POLYAPHRON TREATMENTS

This invention pertains to a method for the removal of dense, nonaqueous-phase liquid contaminants from the subsurface by in-situ conversion of the dense liquids to light, nonaqueous-phase liquids.

The contamination of groundwater by nonaqueous-phase liquids ("NAPLs") is a major environmental problem in the U.S. and worldwide. Common organic contaminants include trichloroethylene, tetrachloroethylene, trichloroethane, carbon tetrachloride, and gasoline. Generally, organic-phase contaminants are categorized as either light nonaqueous-phase liquids ("LNAPLs") or dense nonaqueous-phase liquids ("DNAPLs"), depending on their density relative to that of water. For example, NAPLs such as petroleum hydrocarbons, which have densities lighter than water, are classified as LNAPLs, while chlorinated solvents, which have densities heavier than water, are classified as DNAPLs.

LNAPL contaminants typically migrate downward through unsaturated zones in the Earth's subsurface and pool when they reach the water table. Once in the subsurface, an LNAPL source can either spread due to advection, be trapped in pores, or dissolve to form a downstream plume of contaminant in the aqueous phase. Light contaminants tend to remain at the capillary fringe, which benefits remediation because the contamination source can often be effectively targeted using techniques such as vapor extraction, vacuum extraction, and various pump-and-treat methods.

DNAPLs typically pose a more serious environmental risk than LNAPLs. DNAPL contaminants are one of the most common problems affecting groundwater quality. This type of contamination can result from degreasing operations, underground disposal, leaking underground storage tanks, etc.

DNAPLs typically migrate below the water table and into the Earth's saturated zone due to their higher density relative to water. Once the bulk DNAPL is in the saturated zone, further transport will depend mainly on subsurface morphology, gravitational forces, capillary forces, and pressure gradients. Eventually, much of the dense contaminant will either pool on top of low-permeability strata, or be trapped by capillary forces in the form of very small ganglia (sizes on the order of the pore scale). Because of this behavior, remediation of DNAPL-contaminated sites is more challenging than for LNAPLs. More specifically, locating a DNAPL source zone and targeting it is more difficult because of the depth and the extent to which it may have moved. Furthermore, most methods that induce mobilization of DNAPL source zones involve increased risks because gravitational forces can cause the DNAPL to move deeper into the subsurface.

Currently, the primary method of recovering DNAPL contaminants is through remediation methods such as surfactant flooding, foam injections, pump-and-treat, etc. However, DNAPL remediation has significant problems. See National Research Council, *Groundwater and Soil Cleanup*, pp. 4–11 (National Academy Press, Washington D.C., 1999). For example, J. C. Fountain et al., "Controlled Field Test of Surfactant-enhanced Aquifer Remediation,") *Ground Water*, vol. 34(5), pp. 910–916 (1996) describes an alternative remediation process using surfactants. While surfactant-aided processes offer significant benefits over conventional pump-and-treat methods, they increase the risk of inadvertent subsurface mobilization.

G. J. Hirasaki, et al., "Surfactant/foam Process for Aquifer Remediation,") pp. 471–480, proceedings of the SPE International Symposium on Oilfield Chemistry (Houston, Tex., Feb. 18–21, 1997) describes another remediation process using foam. Foam processes offer similar advantages to surfactant flooding, while simultaneously providing improved mobility control due to the high apparent-viscosity of foam. These processes can be selective in targeting DNAPL source zones within heterogeneous strata, because most foams tend to break upon contact with organic phases. However, foam-injection processes can require very large pressure gradients, and typically do not address density problems that occur during mobilization.

U.S. Pat. No. 6,210,955 discloses a process of in-situ remediation of contaminated soils comprising introducing a treating agent (e.g., nutrients, surfactants, oxidants and solvents, and bacterial cultures) into the contaminated soil and transporting the treating agent to an underground in-situ treatment zone using a foam-based fluid.

Another significant problem associated with remediation is inadvertent mobilization of DNAPL contaminants. See K. D. Pennell et al., "Influence of Viscous and Buoyant Forces on the Mobilization of Residual Tetrachloroethylene During Surfactant Flushing,") *Environ. Sci. Technol.*, vol. 30, no. 4, pp. 1328–1335 (1996). Because of this risk, a number of investigators have proposed techniques that involve density modification.

K. Kostarelos et al., "A new concept: the use of neutrally-buoyant microemulsions for DNAPL remediation,") *J. Contaminant Hydrology*, vol. 34, pp. 383–397 (1998) discloses formulations that promote neutrally-buoyant displacements by controlling the density of DNAPL-containing microemulsions.

C. T. Miller et al., "Remediation of DNAPL-Contaminated Subsurface Systems Using Density-Motivated Mobilization,") *Environ. Sci. Technol.*, vol. 34, no. 4, pp. 719–724 (2000) discloses modifying the aqueous-phase density via the use of concentrated NaI solutions. In upward-directed flow experiments, these high-density aqueous phase solutions were able to displace continuous-phase DNAPLs.

S. Lunn et al., "Manipulation of density and viscosity for the optimization of DNAPL recovery by alcohol flooding,") *J. Contam. Hydrol.*, vol. 38, pp. 427–445 (1999a) discloses an alternative method of decreasing inadvertent mobilization using upward-directed alcohol floods as a means to control the mobilization.

Other alternative methods for decreasing inadvertent mobilization involve density modifications of both DNAPL and LNAPL phases. See S. Lunn et al., "Risk Reduction During Chemical Flooding: Preconditioning DNAPL Density in Situ Prior to Recovery by Miscible Displacement,") *Environ. Sci. Technol.*, vol. 33, pp. 1703–1708 (1999b); and E. Roeder et al., "Swelling of DNAPL by Cosolvent Flooding to Allow its Removal as an LNAPL,") 333–345, proceedings of the ASCE Specialty Conference, Washington D.C. (Nov. 12–14, 1996). Both S. Lunn et al. (1999) and E. Roeder et al. (1996) discuss using alcohol as a co-solvent to decrease the DNAPL-phase density. However, Lunn used ethylene glycol to increase the alcohol-solution density to 1.11 g/mL, and a post-flush of polymer to maintain viscous stability, while Roeder used glycerin and sucrose solutions for a similar effect.

Despite positive results obtained from laboratory studies, the mobilization processes described above require aggressive chemical treatments and idealized flow conditions. The microemulsion process described by K. Kostarelos et al. (1998) typically reduces the potential for solubilization, and is relatively incapable of converting the density of DNAPLs to values lower than the groundwater density. Miscible alcohol flooding requires injecting large volumes of concentrated fluids. For example, S. Lunn et al.(1999b) injected a volume of 90% 1-propanol that was between six times and 61 times the total volume of the contaminant. Similarly, techniques to modify the aqueous-phase density require highly concentrated solutions (e.g., 60% NaI, or 65% ethylene glycol with 35% 1-propanol) that may significantly impact groundwater quality or subsurface ecology. Furthermore, because these techniques employ miscible displacements, field treatments would probably require large injections to overcome the effects of heterogeneity and dilution by dispersive mixing. Finally, it should be noted that many of the above-mentioned techniques only induce a near neutral density change with respect to the aqueous phase, which still leaves the difficult problem of producing an upward-directed flow in the field. (It should also be noted that most of the studies discussed above employed upward flow in columns or two-dimensional cells.)

An unfilled need exists for an inexpensive process for removing dense substance contaminants, while minimizing the risks of inadvertent downward mobilization of the contaminants.

We have discovered a novel method for the remediation of dense contaminants through the in-situ conversion of the dense contaminants into light contaminants. This method is a precursor treatment for remediation. It uses injection techniques and controlled destabilizing techniques to upwardly mobilize dense contaminants classified as DNAPLs. In one embodiment, a treating agent (e.g., polyaphron solution) comprising a light organic-phase fluid (e.g., kerosene, xylene, octane, hexane, etc.) is injected into the Earth's subsurface, targeted at a contaminant source zone. A post-flush agent comprising a polyvalent cation (e.g., $Al^{3+}$, $Fe^{3+}$, etc.) is injected to destabilize the polyaphron, which induces in-situ mixing between the light organic-phase fluid and the dense contaminant. The dense contaminant is converted to a light contaminant (i.e., a contaminant having a density less than the density of groundwater), which assists upward mobilization once it has begun. Unlike prior methods of DNAPL density modifications, the novel process does not require cosolvents or phase partitioning. Rather, it uses in-situ mixing of a light-organic phase with the contaminant. The process also removes the risk of downward mobilization, allowing the use of other known methods of remediation to remove the contaminants from the soil.

Figure 1:
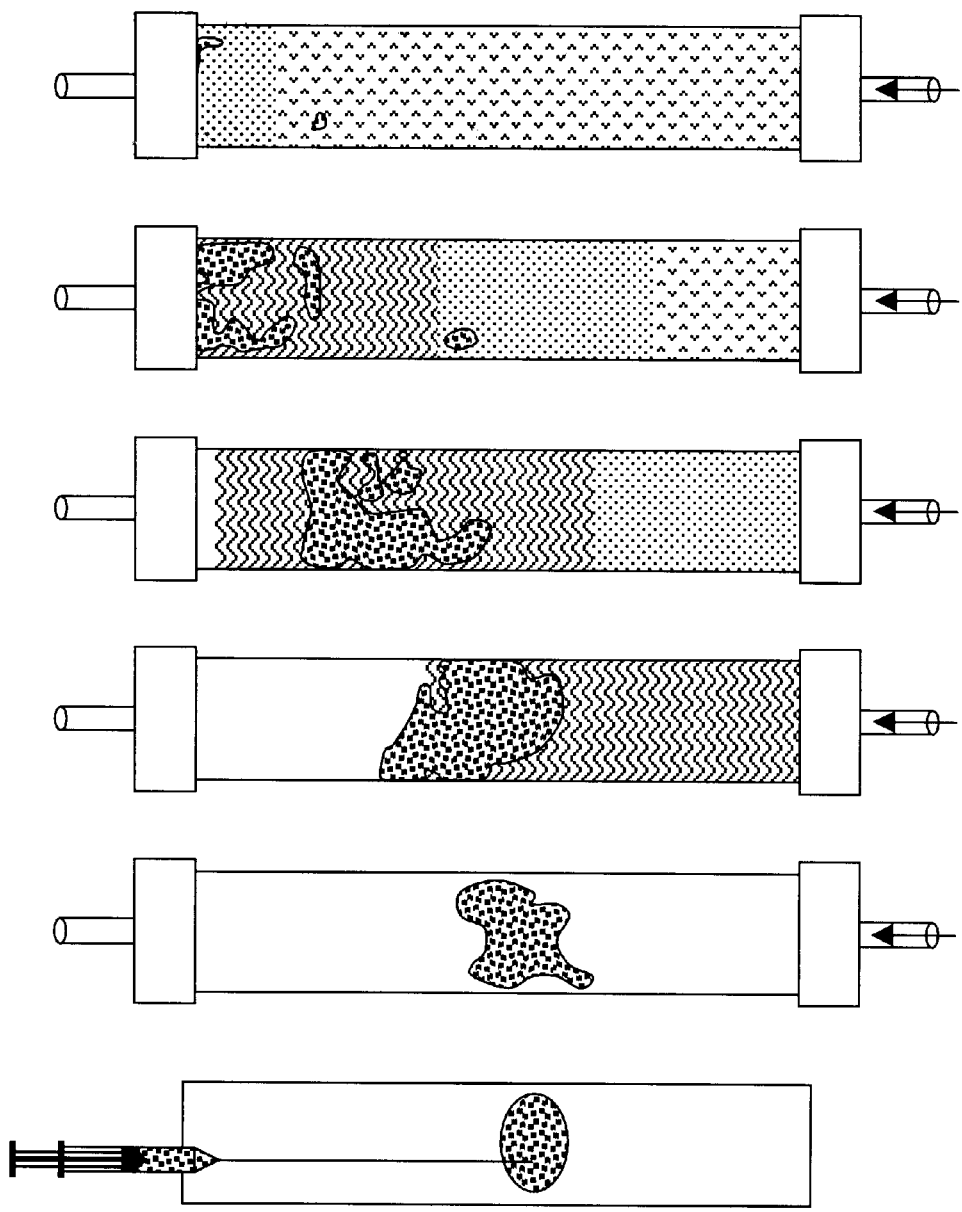
FIG. 1 is a schematic illustrating the transitional stages and mobilization of a dense contaminant after an upwardly-directed application of the treatment process.

The general purpose of this invention is to provide an inexpensive treatment process for the remediation of dense contaminants. More specifically, the purpose of this invention is to provide an inexpensive method for upward mobilization of dense contaminants (e.g., DNAPLs) by inducing in-situ conversion of the dense contaminants to light contaminants (e.g., LNAPLs). To induce the density conversion, the treating agent comprises a light organic-phase fluid that is miscible with the contaminant, and that can be formulated as a high internal-phase-ratio emulsion. In a preferred embodiment, the treating agent is a polyaphron solution comprising a light organic-phase fluid (e.g., kerosene, xylene, octane, hexane, etc.).

Polyaphrons are biliquid foams comprising a discontinuous phase and an encapsulating phase. There are essentially two types of biliquid foams: oil-lamella and water-lamella. The latter is of primary concern in the present invention. In water-lamella foams, the discontinuous phase is an oil or other non-polar liquid, and the encapsulating phase is water or other hydrogen-bonded liquid containing a soluble surfactant. Both the encapsulating film and the foam lamella are stabilized by the surfactant. Polyaphrons can be produced by placing an aqueous gas foam on top of a non-polar liquid. More non-polar liquid is then poured onto the aqueous gas foam. The non-polar liquid is coated with the aqueous solution as it penetrates the foam in the form of fine droplets. At the bottom of the gas foam, the non-polar liquid passes through a second interface and completes the requirements for a polyaphron foam. See U.S. Pat. No. 4,486,333 for additional details on methods for preparing polyaphrons.

Polyaphron solutions are capable of remaining highly stable for extended time periods (up to 2 years without much deterioration), and can be transported without degradation within a porous media. See W. Vidrine et al., "Emulsions in porous media. I. Transport and stability of polyaphrons in sand packs,") *Colloids and Surfaces*, vol. 175, pp. 277–287 (2000).

Polyaphron concentrations may be as high as 96% by volume, dispersed in 4% water. Individual aphrons typically range in size from 1 to 10 mm. Different surfactants (e.g., sodium dodecyl sulfate, sodium dodecyl benzene sulfonate, polyoxymethylene secondary alcohol, polyoxymethylene sorbital monooleate, polyoxyethylene lauryl ether, hexadecyltrim ethyl ammonium bromide, etc.) and organic-phase liquids can be used depending on the desired composition of the polyaphron. See F. Sebba et al., *Foams and Biliquid Foams*—Aphrons, pp. 103–127 (John Wiley & Sons, New York, 1987).

In one embodiment, the novel pretreatment process induces in-situ mixing of light organic species with DNAPL contaminants, thus reducing the density of trapped or pooled DNAPL contaminants. (DNAPL density is reduced by delivering a light hydrocarbon that mixes with the contaminant, altering its behavior by transforming it into a lighter-density contaminant.) The polyaphron solution allows targeted delivery of the light organic species deep into the formation, which would not be possible if the light organic were injected in a bulk phase.

In this embodiment, the novel method comprises the steps of: (1) injecting a sufficient amount of polyaphron into the Earth's subsurface, targeted within or adjacent to the contaminant source zone; and (2) later, injecting a sufficient amount of a post-flush agent comprising a polyvalent cation (e.g., $Al^{3+}$, $Fe^{3+}$, etc.), or a similar polyvalent species, to effectively destabilize the polyaphrons. The destabilized polyaphrons can then mix with the DNAPL to convert the contaminant to a density less than the density of groundwater The quantity and concentration of the polyaphrons and of the destabilizing agent, and the density of the nonpolar liquid, are such that the overall density of the resulting mixture of the nonpolar liquid and the nonpolar contaminant is less that the density of ambient groundwater, including substances it may hold such as salts, etc. Once in-situ conversion (i.e., transformation of DNAPL contaminants to lighter-density contaminants) has thus occurred, any number of remediation strategies can then be implemented (e.g., pump-and-treat remediation, excavation, foam injections, surfactant injections, vapor stripping, etc.). (Surfactant or foam injections are probably the most effective post-treatment remediation strategies in many circumstances.)

The novel method has several advantages over other density-modification treatments. First, the volume of injected species (excluding water) is reduced. The novel method requires a much smaller volume of injected fluid than processes such as high-concentration co-solvent flooding. Second, costs and environmental harm are reduced compared to other remediation methods. (The chemical species employed in the process can be inexpensive, relatively environmentally benign chemical species.) Third, light-organic species are not susceptible to dilution by dispersive mixing because they are delivered as a separate phase. By contrast, the alternative methods for density modification are highly susceptible to dispersion of the injected cosolvent, which causes dilution and a loss of effectiveness. Fourth, the final contaminant density can be controlled over a large range by choosing the volume of the light phase that is injected relative to the volume of contaminant in the subsurface. (In theory, the density of the converted contaminant could be made to asymptotically approach the density of the light-hydrocarbon injection.) Finally, the process may be used as a precursor treatment that may be coupled with any number of other remediation strategies, including surfactant flooding, vapor extraction, vacuum extraction, pump-and-treat remediation, and excavation.

EXAMPLE 1

Construction of a Model Contamination Source Zone

Two experiments were conducted to demonstrate the effectiveness of the novel process. In both experiments, to simulate a contamination source zone, a 10 mL sample of 1,2-dichlorobenzene (DCB) (classified as a DNAPL contaminant) was placed in the middle of a packed glass column using a syringe. The glass column had an inner diameter of 5.08 cm and a length of 30 cm. The glass column contained approximately 40–50 mesh glass beads having a range of diameters between 300–400 $\mu$m. The dimensions of the glass column were selected so that gravitational forces were not overwhelmed by capillary forces, which could be the case for significantly smaller diameters. (The dichlorobenzene could be monitored visually as red patches in the glass beads.)

EXAMPLE 2

Tests Conducted

FIG. 1 illustrates the upward mobilization of the contaminant after an upwardlydirected application of the precursor treatment process. Water was injected in the upward direction from underneath the contamination source. This established an ideal experimental treatment condition because dichlorobenzene droplets were trapped in the column by capillary forces. (No dichlorobenzene was displaced from the column during this initial trapping step with water.) A polyaphron solution comprising 50% hexane was then injected through tubing, from underneath the source zone, in an upward direction, at 1.5 mL/min (Darcy velocity =1.26× $10_{-3}$cm/s), for 0.7 pore volumes (PV). (One pore volume of injected fluid is equal to the volume of fluid contained in the void space of the test material.)

The polyaphron solution was prepared by placing a 5.0 mL sample of sodium dodecyl-benzene sulfonate (SDBS) solution (4 g/L in water) into a beaker and stirring the solution, using a magnetic stirrer, until a stable foam was produced. As stirring continued, 95 mL of hexane, containing 0.5% (v/v) tergitol 15-S-5 surfactant, was slowly added to the foam. (Hexane was used in this experiment, instead of kerosene, because it facilitated compositional analysis of the effluent.) The 95% hexane (v/v) polyaphron solution was then diluted to 50% by adding water to facilitate easier pumping and injection. Once the polyaphron solution was injected, a post-flush solution of 50 mM Al(NO$_3$) was later injected into the source zone in an upward direction, at 1.5 mL/min for 0.7 PV, to destabilize the polyaphrons. A surfactant solution of 4 g/L hexadecyl trimethyl ammonium bromide (HTAB) was then slowly injected into the source zone, in an upward direction, at an increasing rate until the dichlorobenzene began to mobilize, which occurred at an injection rate of approximately 1.0 mL/min.

As shown in FIG. 1, the dark patches in the middle of the column in the first and second frame (starting from the left side) depict trapped DNAPL after injecting it into the column. The third frame shows a slight upward movement of the DNAPL after injecting a 0.62 PV polyaphron solution. The fourth frame shows additional upward movement of the DNAPL after injecting a 0.35 PV Al$^{3+}$ solution. The fifth and sixth frames show upward movement of the DNAPL after injecting 0.24 PV and 0.86 PV HTAB solutions, respectively. The dichlorobenzene was displaced from the top of the column. The organic phase fluid was collected at the outlet and analyzed using nuclear magnetic resonance. Results indicated that 97% of the total dichlorobenzene was recovered in the effluent, and that the composition of the bulk organic fluid was 17% dichlorobenzene and 83% hexane.

EXAMPLE 3

Figure 2:
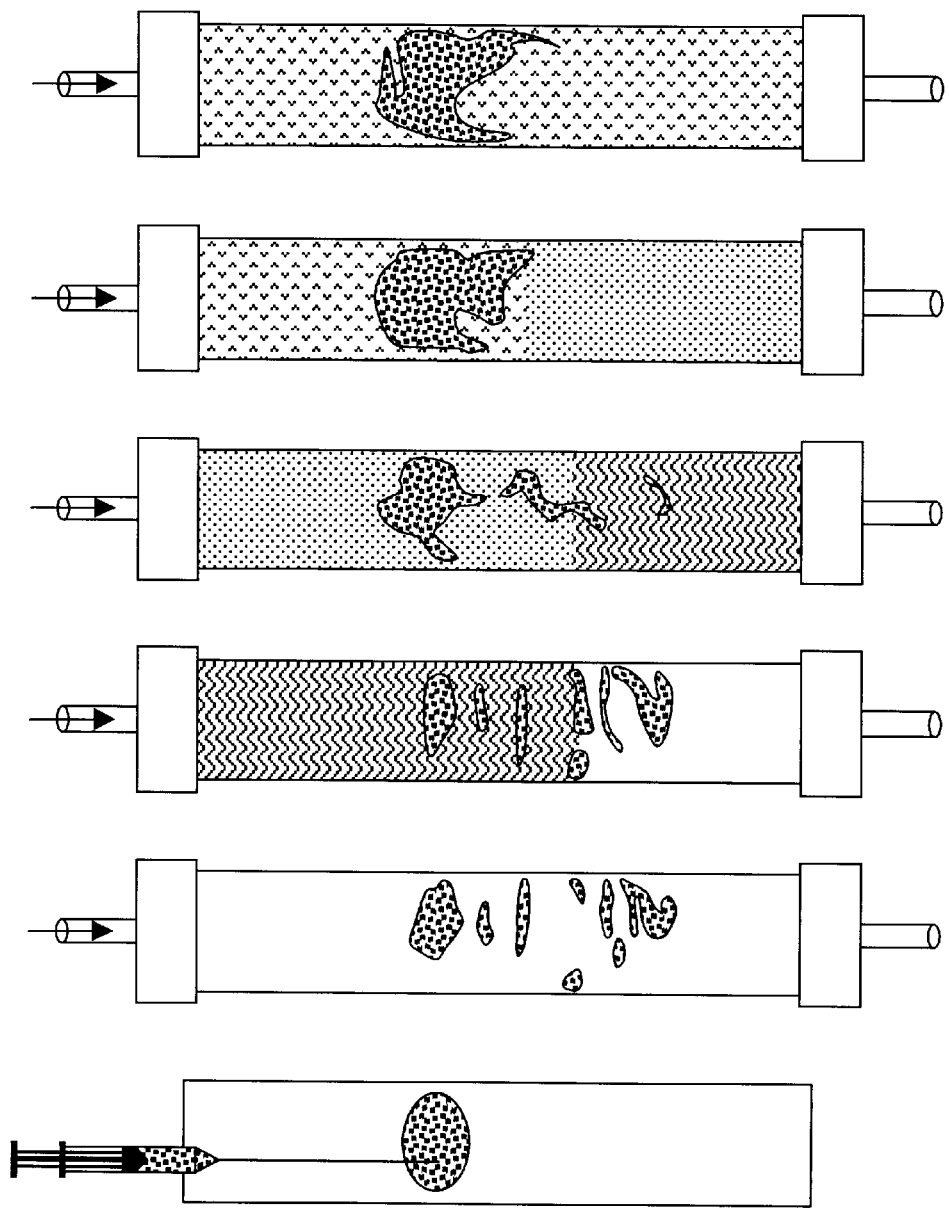
FIG. 2 is a schematic illustrating the transitional stages and mobilization of a dense contaminant after a downwardly-directed application of the treatment process.

To confirm that the upward displacement of the contaminant was not directly related to the upward injection of the precursor treatment process, an equivalent downflow experiment was conducted using the contamnination source zone apparatus discussed above. FIG. 2 illustrates the upward mobilization of a contaminant after a downwardly-directed application of the precursor treatment process. The simulated source zone was introduced into the column in the same manner described above. However, the polyaphron solution was injected in the downward direction. The post-flush solution of 50 mM Al(NO$_3$) was then injected into the source zone, in a downward direction, at 1.5 mL/min for 0.7 PV. The surfactant solution of 4 g/L HTAB was then slowly injected into the source zone in a downward direction, at an increasing rate until the dichlorobenzene began to mobilize, which also occurred at an injection rate of approximately 1.0 mL/min.

As previously mentioned, the dark patches in the middle of the column in the first and second frame (starting from the left side) depict trapped DNAPL after injecting it into the column. The third frame shows a slight upward movement of the DNAPL after downwardly injecting the 0.62 PV polyaphron solution into the source zone. The fourth frame shows additional upward movement of the DNAPL after downwardly injecting the 0.35 PV Al$^{3+}$ solution. The fifth and sixth frames show upward movement of the DNAPL after injecting 0.24 PV and 0.86 PV HTAB solutions, respectively.

At lower injection rates (~1.0 mL/min), upward movement of dichlorobenzene was observed due to the buoyant forces present in the source zone. However, once the surfactant solution injection rate reached 3.2 mL/min, the dichlorobenzene began mobilizing in the downward direction due to viscous drag.

CONCLUSIONS

From the above test results, several conclusions were made. The NMR analysis of the bulk effluent indicated that the DCB was successfully displaced from the column. Downward mobilization required an injected flowrate three times greater than upward mobilization, which suggests that complete in-situ conversion from a DNAPL to an LNAPL occurred.

In other experiments (data not shown), variables that appeared to affect the process included the concentration of the polyaphron solution, the rate and volume of injected fluids, the cation solution injection rate, and the use of additional surfactant during injection. From a practical standpoint, the effects of heterogeneity and horizontal injection are important because such effects are common in the field.

The complete disclosures of all references cited in this specification are hereby incorporated by reference. Also incorporated by reference is the following grant proposal submitted by the inventors: K. Thompson et al., "Novel Method for DNAPL Recovery Using Polyaphron Treatments,") on Dec. 20, 2001. In the event of an otherwise irreconcilable conflict, however, the present specification shall control.

We claim:

1. A method for reducing the effective density of a subsurface, nonpolar contaminant, whose initial density is greater than the density of ambient groundwater, to have a density less than the density of ambient groundwater, said method comprising the steps of:

(a) introducing, into the vicinity of the contaminant, polyaphrons having a discontinuous phase comprising a nonpolar liquid whose density is less than the density of ambient groundwater, and having an encapsulating phase comprising water and a surfactant; and (b) subsequently introducing into the vicinity of the contaminant an agent comprising a polyvalent cation in sufficient quantity and concentration to destabilize the polyaphrons, so that the nonpolar liquid is no longer encapsulated by an encapsulating phase;

whereby:

(c) the nonpolar liquid thereby released from the polyaphrons in the vicinity of the nonpolar contaminant then mixes with the nonpolar contaminant, thereby reducing the overall density of the resulting mixture as compared to the density of the initial nonpolar contaminant;

and wherein:

(d) the quantity and concentration of the polyaphrons and of the destabilizing agent, and the density of the nonpolar liquid, are such that the overall density of the resulting mixture of the nonpolar liquid and the nonpolar contaminant is less than the density of ambient groundwater.

2. A method as recited in claim 1, wherein the polyvalent cation is a trivalent cation selected from the group consisting of $Fe^{3+}$ and $Al^{3+}$.

3. A method as recited in claim 1, wherein the polyvalent cation comprises $Fe^{3+}$.

4. A method as recited in claim 1, wherein the polyvalent cation comprises $Al^{3+}$.

5. A method as recited in claim 1, wherein the nonpolar liquid comprises a hydrocarbon selected from the group consisting of hexane, octane, a xylene, and kerosene.

6. A method as recited in claim 1, additionally comprising the subsequent step of causing a liquid comprising water to flow into the vicinity of the mixture of the nonpolar liquid and the nonpolar contaminant, wherein the liquid has a density greater than the density of the mixture.

7. A method as recited in claim 6, additionally comprising the subsequent step of removing the nonpolar contaminant from the ground after it is recovered.

8. A method as recited in claim 6, wherein the liquid used in said subsequent step additionally comprises a surfactant.

9. A method as recited in claim 6, wherein the liquid used in said subsequent step comprises a foam.

* * * * *